US012684656B2

(12) United States Patent
Luo et al.

(10) Patent No.: US 12,684,656 B2
(45) Date of Patent: Jul. 14, 2026

(54) HEATER AND CIGARETTE DEVICE WITH HEATER

(71) Applicant: SHENZHEN FIRST UNION TECHNOLOGY CO., LTD., Shenzhen City (CN)

(72) Inventors: Jiamao Luo, Shenzhen City (CN); Zuqiang Qi, Shenzhen City (CN); Baoling Lei, Shenzhen City (CN); Ruilong Hu, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 833 days.

(21) Appl. No.: 18/019,796

(22) PCT Filed: Aug. 3, 2021

(86) PCT No.: PCT/CN2021/110375
§ 371 (c)(1),
(2) Date: Feb. 3, 2023

(87) PCT Pub. No.: WO2022/028430
PCT Pub. Date: Feb. 10, 2022

(65) Prior Publication Data

US 2023/0292405 A1 Sep. 14, 2023

(30) Foreign Application Priority Data

Aug. 3, 2020 (CN) ......................... 202010766152.8

(51) Int. Cl.

| | |
|---|---|
| ***H05B 3/00*** | (2006.01) |
| ***A24F 40/20*** | (2020.01) |
| ***A24F 40/46*** | (2020.01) |

(52) U.S. Cl.
CPC .......... *H05B 3/0038* (2013.01); *A24F 40/20* (2020.01); *A24F 40/46* (2020.01);
(Continued)

(58) Field of Classification Search
CPC ........... H05B 3/0038; H05B 2203/013; H05B 2203/016; H05B 2203/032;
(Continued)

(56) References Cited

U.S. PATENT DOCUMENTS

| | | | |
|---|---|---|---|
| 2018/0020737 A1 | 1/2018 | Mironov et al. |
| 2018/0021997 A1 | 1/2018 | Widmer et al. |

FOREIGN PATENT DOCUMENTS

| | | |
|---|---|---|
| CN | 101510020 A | 8/2009 |
| CN | 203046190 U | 7/2013 |

(Continued)

*Primary Examiner* — Robert G Bachner
(74) *Attorney, Agent, or Firm* — PROI Intellectual Property US

(57) ABSTRACT

A heater includes a base body, a conductive module, and an infrared electrothermal coating. The conductive module includes a first electrode and a second electrode spaced on the base body. The first electrode includes a first bar electrode axially extending from a first end to a second end, the second electrode includes a second bar electrode axially extending from the first end to the second end, and at least a part of the infrared electrothermal coating is located between the first bar electrode and the second bar electrode. An equivalent resistance of a part of the infrared electrothermal coating adjacent to the first end is less than an equivalent resistance of a middle part of the infrared electrothermal coating. An equivalent resistance of a part of the infrared electrothermal coating adjacent to the second end is less than the equivalent resistance of the middle part of the infrared electrothermal coating.

13 Claims, 15 Drawing Sheets

(52) U.S. Cl.
CPC .. *H05B 2203/013* (2013.01); *H05B 2203/016* (2013.01); *H05B 2203/032* (2013.01); *H05B 2203/037* (2013.01)

(58) Field of Classification Search
CPC .. H05B 2203/037; H05B 3/145; H05B 3/148; H05B 3/46; H05B 3/04; H05B 2203/021; H05B 2203/022; A24F 40/20; A24F 40/46; A24F 40/40
See application file for complete search history.

(56) References Cited

FOREIGN PATENT DOCUMENTS

| | | | |
|---|---|---|---|
| CN | 103607796 | A | 2/2014 |
| CN | 105517215 | A | 4/2016 |
| CN | 106255243 | A | 12/2016 |
| CN | 109674093 | A | 4/2019 |
| CN | 109832674 | A | 6/2019 |
| CN | 109846093 | A | 6/2019 |
| CN | 110384264 | A | 10/2019 |
| JP | 2014-17439 | A | 1/2014 |
| WO | 2017/194769 | A1 | 11/2017 |
| WO | 2018/054793 | A1 | 3/2018 |

HEATER AND CIGARETTE DEVICE WITH HEATER

CROSS-REFERENCE TO RELATED APPLICATIONS

This application is a 35 U.S.C. § 371 National Phase conversion of International (PCT) Patent Application No. PCT/CN2021/110375, filed on Aug. 3, 2021, which claims priority to Chinese Patent Application No. 202010766152.8, filed with the China National Intellectual Property Administration on Aug. 3, 2020, and entitled "HEATER AND CIGARETTE DEVICE WITH HEATER", which is incorporated herein by reference in its entirety. The PCT International Patent Application was filed and published in Chinese.

TECHNICAL FIELD

This application relates to the technical field of cigarette devices, and in particular, to a heater and a cigarette device with the heater.

BACKGROUND

Smoking items such as cigarettes and cigars burn tobacco during use to produce smoke. Attempts have been made to provide alternatives to these tobacco burning items by producing products that release compounds without burning. Examples of such products are the so-called heat-not-burn products, which release compounds by heating tobacco rather than burning tobacco.

As shown in FIG. 1, the patent CN109846093A discloses a low-temperature baking cigarette device. To shorten a flow distance of a current in a far-infrared coating 32 and reduce a resistance of the far-infrared coating 32 in a current path, a first strip portion 3512 is added based on a first circle portion 3511. The first strip portion 3512 is formed by extending from the first circle portion 3511 along a longitudinal direction of a heating base body 31 to a second end b of the heating base body 31 (a second conductive module 352 is similar to this), so that the current flows along a circumferential direction of the heating base body 31.

As shown in FIG. 2, the low-temperature baking cigarette device has a problem that a difference between temperatures of two ends of the heating base body 31 and a temperature of a middle part reaches about 100° C., which easily leads to uneven local heating and a long preheating time.

SUMMARY

This application provides a heater and a cigarette device with the heater to resolve the problem of large temperature gradient of a heating base body in the existing cigarette devices.

An aspect of this application provides a heater, including:

a base body, having a surface;

an infrared electrothermal coating, having a first end and a second end opposite to each other, where the infrared electrothermal coating is formed on the surface of the base body and axially extends from the first end to the second end; and a conductive module, including a first electrode and a second electrode spaced on the base body, where the first electrode includes a first bar electrode axially extending from the first end to the second end, the second electrode includes a second bar electrode axially extending from the first end to the second end, and at least a part of the infrared electrothermal coating is located between the first bar electrode and the second bar electrode, where an equivalent resistance of a part of the infrared electrothermal coating adjacent to the first end is less than an equivalent resistance of a middle part of the infrared electrothermal coating; and/or an equivalent resistance of a part of the infrared electrothermal coating adjacent to the second end is less than an equivalent resistance of the middle part of the infrared electrothermal coating.

Another aspect of this application provides a cigarette device. The cigarette device includes a housing assembly and the heater, where the heater is arranged in the housing assembly.

In the heater and the cigarette device with the heater provided in this application, with smaller equivalent resistances at two ends of the infrared electrothermal coating, larger current density and more heat are generated at the two ends, to implement temperature compensation at two ends of the base body and improve uniformity of a temperature field of the base body.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

For ease of understanding of this application, this application is described below in more detail with reference to the accompanying drawings and specific embodiments. It should be noted that, when a component is expressed as "being fixed to" another component, the component may be directly on the another component, or one or more intermediate components may exist between the component and the another component. When a component is expressed as "being connected to" another component, the component may be directly connected to the another component, or one or more intermediate components may exist between the component and the another component. The terms "upper", "lower", "left", "right", "inner", "outer", and similar expressions used in this specification are merely used for an illustrative purpose.

Unless otherwise defined, all technical and scientific terms used herein have the same meaning as commonly understood by a person skilled in the art to which this application belongs. Terms used in the specification of this application are merely intended to describe objectives of the specific embodiments, and are not intended to limit this application. A term "and/or" used in this specification includes any or all combinations of one or more related listed items.

EMBODIMENT 1

Figure 3:
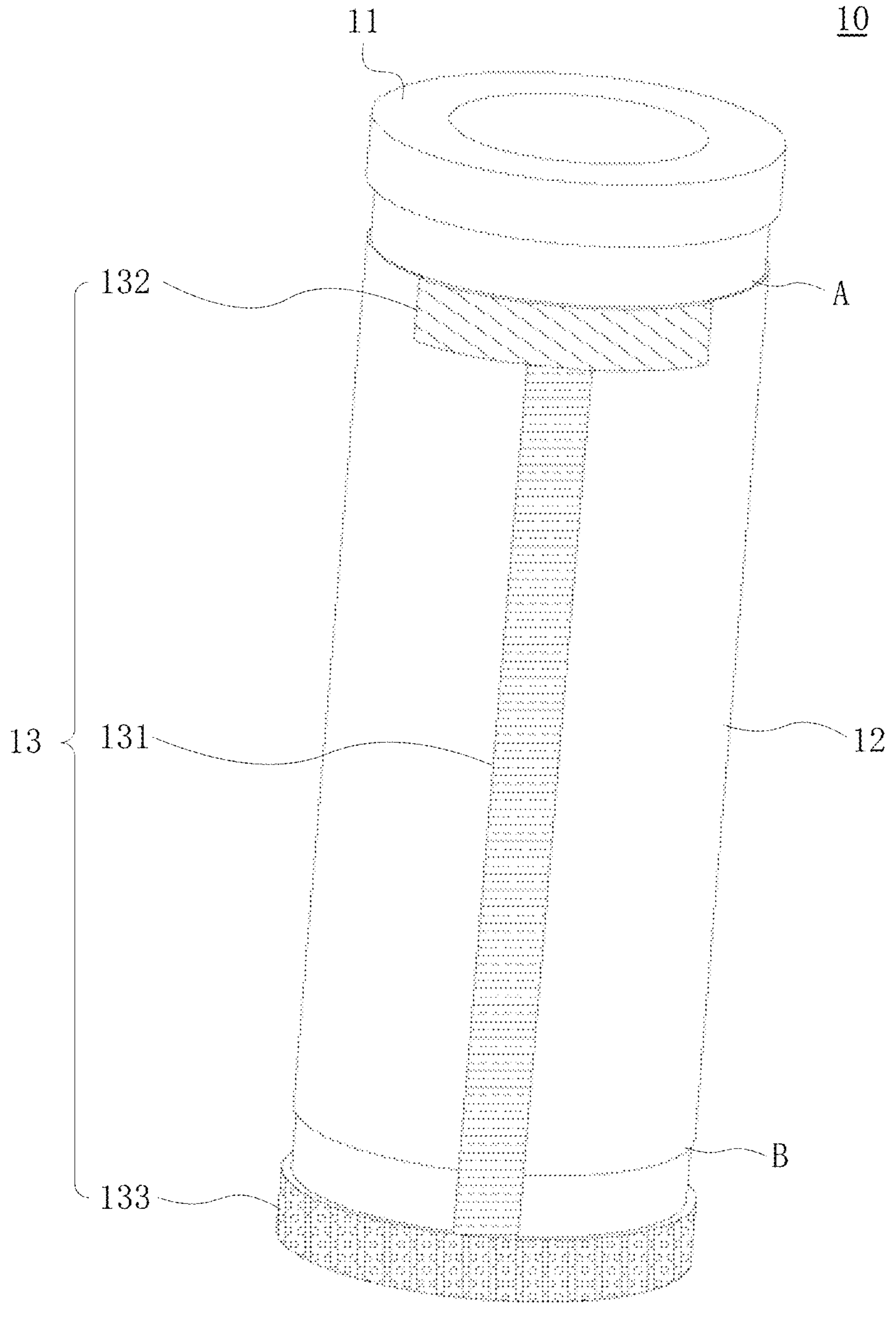
FIG. 3 is a schematic diagram of a heater according to Embodiment 1 of this application.
Figure 4:
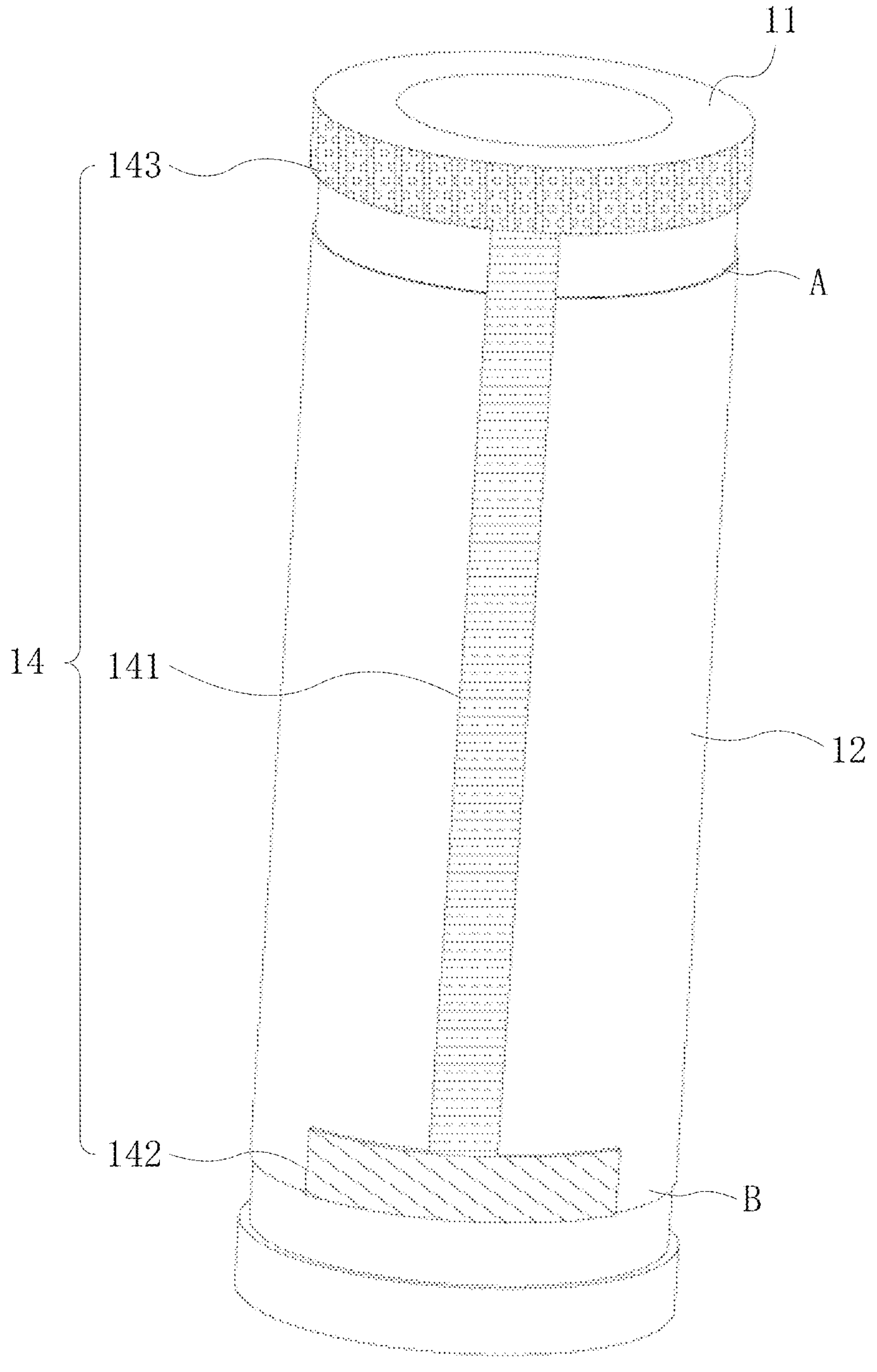
FIG. 4 is a schematic diagram of the heater from another angle of view according to Embodiment 1 of this application.

As shown in FIG. 3 and FIG. 4, Embodiment 1 of this application provides a heater for heating an aerosol-forming substrate in a cigarette device to generate an aerosol for inhalation. The heater 10 includes:

- a base body 11, where a cavity suitable for accommodating the aerosol-forming substrate is formed inside.

Specifically, the base body 11 is hollow inside and the cavity suitable for accommodating the aerosol-forming substrate is formed inside. A shape of the base body 11 may be a cylinder, a prism, or another column. The shape of the base body 11 is preferably a cylinder, and the cavity is a cylindrical hole penetrating a middle portion of the base body 11. An inner diameter of the hole is slightly larger than an outer diameter of an aerosol-forming article, so that the aerosol-forming article can be placed in the cavity to be heated.

- the base body 11 may be made of a high-temperature-resistant and transparent material such as quartz glass, ceramic, or mica, or may be made of another material with a high infrared transmittance, such as: a high-temperature-resistant material with an infrared transmittance of above 95%, which is not specifically limited herein.

The aerosol-forming substrate is a substrate capable of releasing a volatile compound that can form an aerosol. Such volatile compound can be released by heating the aerosol-forming substrate. The aerosol-forming substrate may be a solid or a liquid or include solid and liquid components. The aerosol-forming substrate may be loaded on a carrier or a support by adsorbing, coating, or soaking or in another manner. The aerosol-forming substrate may be conveniently a part of the aerosol-forming article.

The aerosol-forming substrate may include nicotine. The aerosol-forming substrate may include tobacco, such as a tobacco-containing material that contains a volatile tobacco flavor compound. The volatile tobacco flavor compound is released from the aerosol-forming substrate during heating. Preferably, the aerosol-forming substrate may include a homogeneous tobacco material, such as cast-leaf tobacco. The aerosol-forming substrate may include at least one aerosol-forming agent. The aerosol-forming agent may be any suitable known compound or a mixture of compounds. In use, the compound or the mixture of compounds helps to form a dense and stable aerosol, and basically has resistance against thermal degradation under an operation temperature of an aerosol-generating system. Suitable aerosol-forming agents are well-known in the related art, and include but are not limited to: polyhydric alcohols, such as triethylene glycol, 1,3-butanediol, and glycerin; esters of polyhydric alcohols, such as glycerol mono-, di-, or triacetate; and fatty acid esters of mono-, di-, or polycarboxylic acids, such as dimethyl dodecanedioate and dimethyl tetradecanedioate. Preferably, the aerosol-forming agent is polyhydroxy alcohols or a mixture thereof, such as triethylene glycol, 1,3-butanediol, and most preferably, glycerin.

The infrared electrothermal coating 12 has a first end A and a second end B. The infrared electrothermal coating 12 is formed on a surface of the base body 11 and axially extends from the first end A to the second end B. The infrared electrothermal coating 12 may be formed on an outer surface of the base body 11, or may be formed on an inner surface of the base body 11.

In this example, the infrared electrothermal coating 12 is formed on the outer surface of the base body 11. The infrared electrothermal coating 12 receives electrical power to produce heat, thereby generating infrared rays of a specific wavelength, for example: far-infrared rays ranging from 8 μm to 15 μm. When a wavelength of the infrared rays matches an absorption wavelength of the aerosol-forming substrate, energy of the infrared rays is easily absorbed by the aerosol-forming substrate. The wavelength of the infrared rays is not limited. The infrared rays may be infrared rays whose wavelength ranges from 0.75 μm to 1000 μm, and preferably far-infrared rays whose wavelength ranges from 1.5 μm to 400 μm.

The infrared electrothermal coating 12 is preferably formed by far-infrared electrothermal ink, ceramic powder, and inorganic binder fully stirred and then coated on the outer surface of the base body 11, and then dried and cured for some time. A thickness of the infrared electrothermal coating 12 ranges from 30 μm to 50 μm. Certainly, the infrared electrothermal coating 12 may be further formed by tin tetrachloride, tin oxide, antimony trichloride, titanium tetrachloride, and anhydrous copper sulfate fully mixed at a certain ratio and stirred and then coated on the outer surface of the base body 11; or may be one of silicon carbide ceramic coating, carbon fiber composite coating, zirconium titanium oxide ceramic coating, zirconium titanium nitride ceramic coating, zirconium titanium boride ceramic coating, zirconium titanium carbide ceramic coating, iron oxide ceramic coating, iron nitride ceramic coating, iron boride ceramic coating, iron carbide ceramic coating, rare earth oxide ceramic coating, rare earth nitride ceramic coating, rare earth boride ceramic coating, rare earth carbide ceramic coating, nickel cobalt oxide ceramic coating, nickel cobalt nitride ceramic coating, nickel cobalt boride ceramic coating, nickel cobalt carbide ceramic coating, or high silicon molecular sieve ceramic coating. The infrared electrothermal coating 12 may further be another existing material coating.

The conductive module 13 is configured to feed the electrical power to the infrared electrothermal coating 12.

Specifically, the conductive module 13 includes a first electrode 13 and a second electrode 14 spaced on the base body 11; the first electrode 13 and the second electrode 14 are symmetrically arranged along a central axis of the base body 11; and the first electrode 13 and the second electrode 14 have opposite polarities, for example: the first electrode 13 is a positive electrode, and the second electrode 14 is a negative electrode; or the first electrode 13 is a negative electrode, and the second electrode 14 is a positive electrode. The first electrode 13 and the second electrode 14 are conductive coatings, the conductive coating may be a metal coating, conductive tape, or the like, and the metal coating may include silver, gold, palladium, platinum, copper, nickel, molybdenum, tungsten, niobium, or a metal alloy material thereof.

In this example, the first electrode 13 includes a first bar electrode 131 axially extending from the first end A to the second end B, and the second electrode 14 includes a second bar electrode 141 axially extending from the first end A to the second end B; and at least a part of the infrared electrothermal coating 12 is located between the first bar electrode 131 and the second bar electrode 141, so that a current on the first bar electrode 131 flows through the infrared electrothermal coating 12 to the second bar electrode 141 along a circumferential direction of the base body 11.

In this example, the first electrode 13 further includes at least one first arc electrode 132 extending from the first bar electrode 131 along the circumferential direction of the base body 11, and the second electrode 14 further includes at least one second arc electrode 142 extending from the second bar electrode 141 along the circumferential direction of the base body 11.

Specifically, the first arc electrode 132 is adjacent to the first end A, and the second arc electrode 142 is adjacent to the second end B. The first arc electrode 132 extends equidistantly from the first bar electrode 131 along two opposite circumferential directions (clockwise and counter-clockwise) of the base body 11, and the second arc electrode 142 extends equidistantly from the second bar electrode 141 along the two opposite circumferential directions of the base body 11. A circumferential length of the first arc electrode 132 and a circumferential length of the second arc electrode 142 both range from 20% to 30%, preferably 25%, of a circumferential length of the base body 11.

In this example, the first electrode 13 further includes a first annular electrode 133 electrically connected to the first bar electrode 131, and the first annular electrode 133 is arranged between the second end B and a lower end portion of base body 11; and the second electrode 14 further a second annular electrode 143 electrically connected to the second bar electrode 141, and the second annular electrode 143 is arranged between the first end A and an upper end portion of the base body 11. None of the first annular electrode 133 and the second annular electrode 143 is in contact with the infrared electrothermal coating 12, that is, the first annular electrode 133 is separated from the second end B, and the second annular electrode 143 is separated from the first end A.

Figure 5:
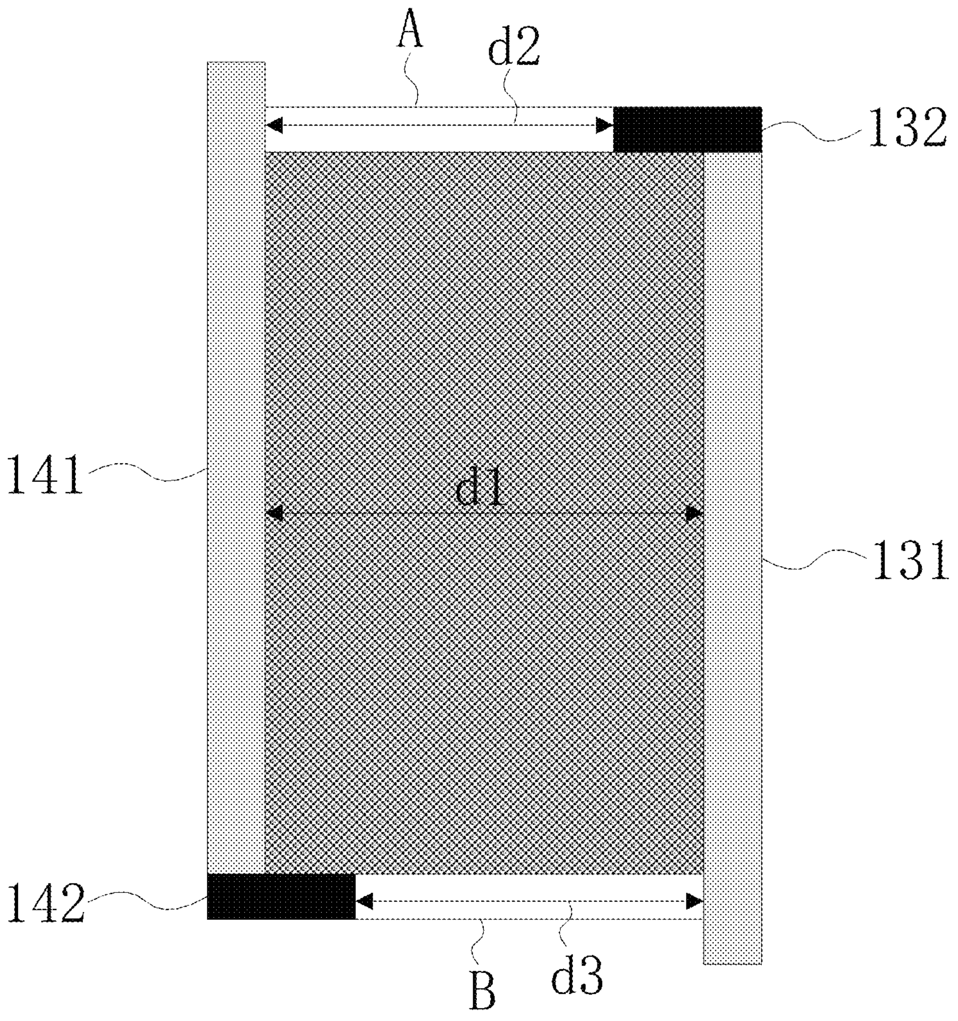
FIG. 5 is a schematic diagram of a part of an outer surface unfolded of the heater according to Embodiment 1 of this application.

Referring to FIG. 5 for understanding, before the first arc electrode 132 and the second arc electrode 142 are arranged, a distance between the first bar electrode 131 and the second bar electrode 141 is d1, and equivalent resistances of the infrared electrothermal coating 12 are basically the same from an axial direction. Heat dissipation at the two ends of the base body 11 is faster than that at the middle part, and therefore, temperatures at the two ends of the base body 11 are significantly different from a temperature at the middle part, resulting in uneven local heating and a long preheating time.

As shown in FIG. 5, after the first arc electrode 132 and the second arc electrode 142 are arranged, the distance between the first arc electrode 132 corresponding to the part of the infrared electrothermal coating 12 adjacent to the first end A (for example, a blank part in the figure) and the second bar electrode 141 decreases to d2 from d1, so that the equivalent resistance of the part of the infrared electrothermal coating 12 also decreases. The distance between the second arc electrode 142 corresponding to the part of the infrared electrothermal coating 12 adjacent to the second end B (for example, a blank part in the figure) and the first bar electrode 131 decreases to d3 from d1, so that the equivalent resistance of the part of the infrared electrothermal coating 12 also decreases. Therefore, the equivalent resistance of the part of the infrared electrothermal coating 12 adjacent to the first end A and the equivalent resistance of the part at the infrared electrothermal coating 12 adjacent to the second end B are both less than an equivalent resistance of the middle part of the infrared electrothermal coating 12 (a mesh part in the figure) (the distance between the electrodes is still d1). After conducting electricity, larger current density and more heat are generated at the part of the infrared electrothermal coating 12 adjacent to the first end A and the part of the infrared electrothermal coating 12 adjacent to the second end B, to implement temperature compensation at the two ends of the base body 11, thereby improving uniformity of a temperature field of the base body 11.

Figure 1:
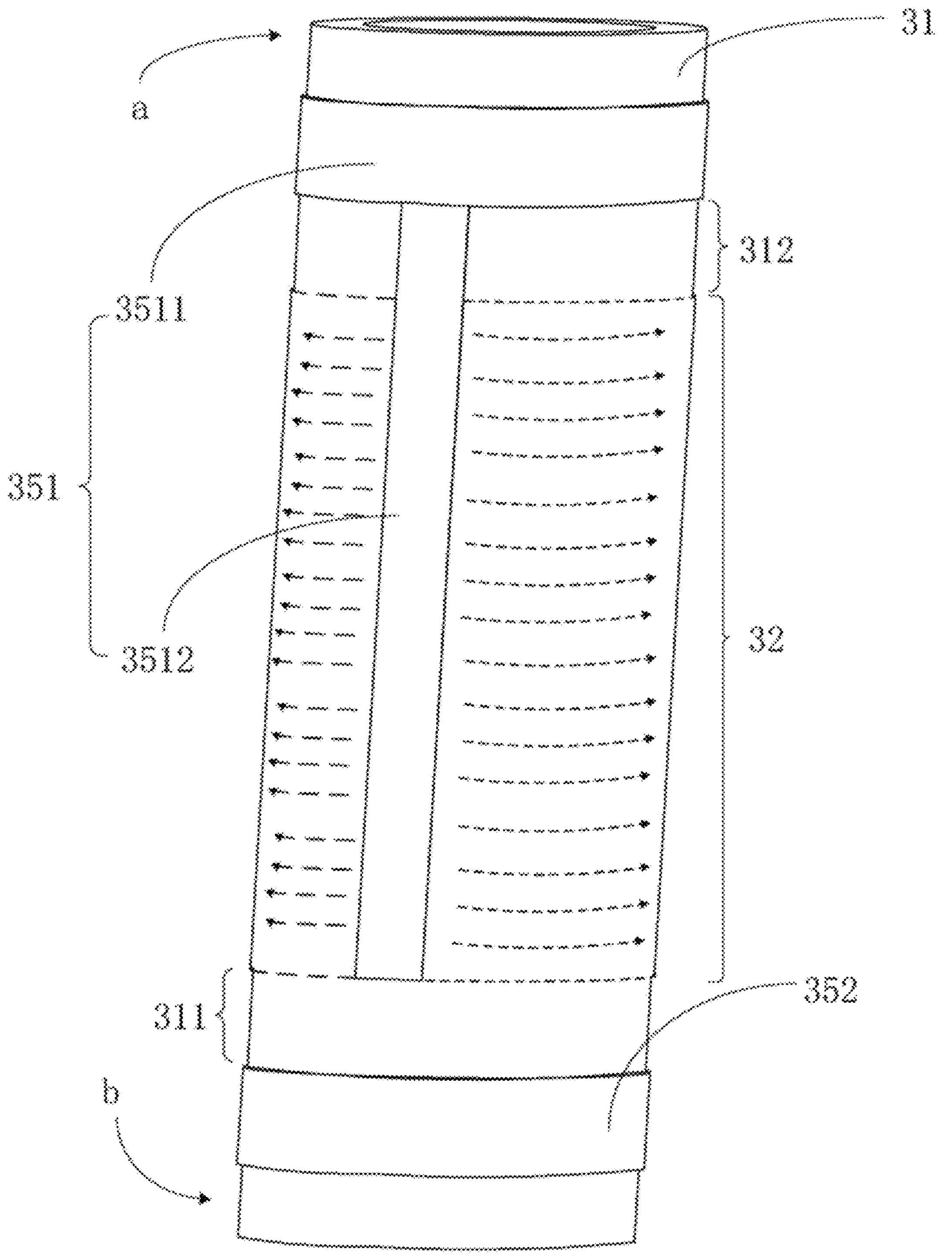
FIG. 1 (Prior Art)
FIG. 1 is a schematic diagram of an existing heater.
Figure 2:
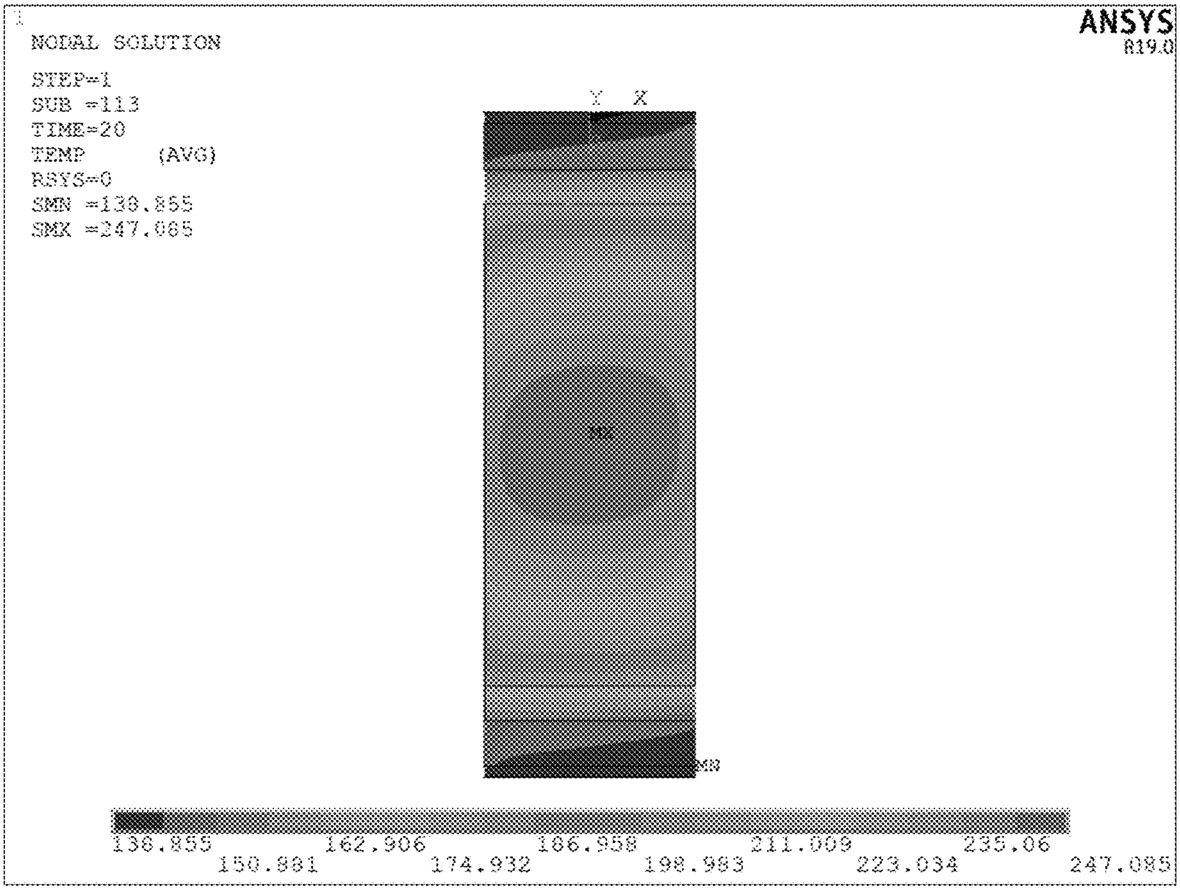
FIG. 2 (Prior Art)
FIG. 2 is a schematic diagram of a temperature field of a heating base body in the existing heater.
Figure 6:
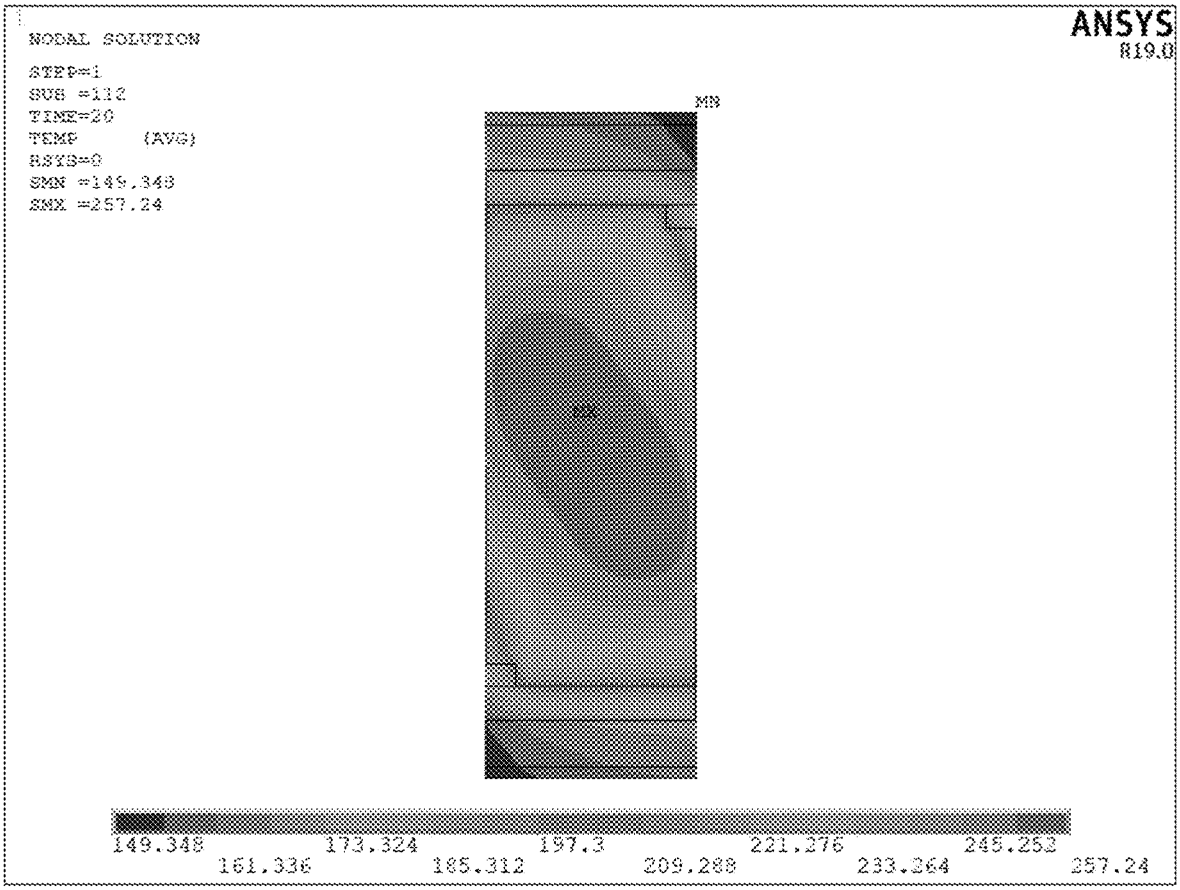
FIG. 6 is a schematic diagram of a temperature field of the heater according to Embodiment 1 of this application.
Figure 7:
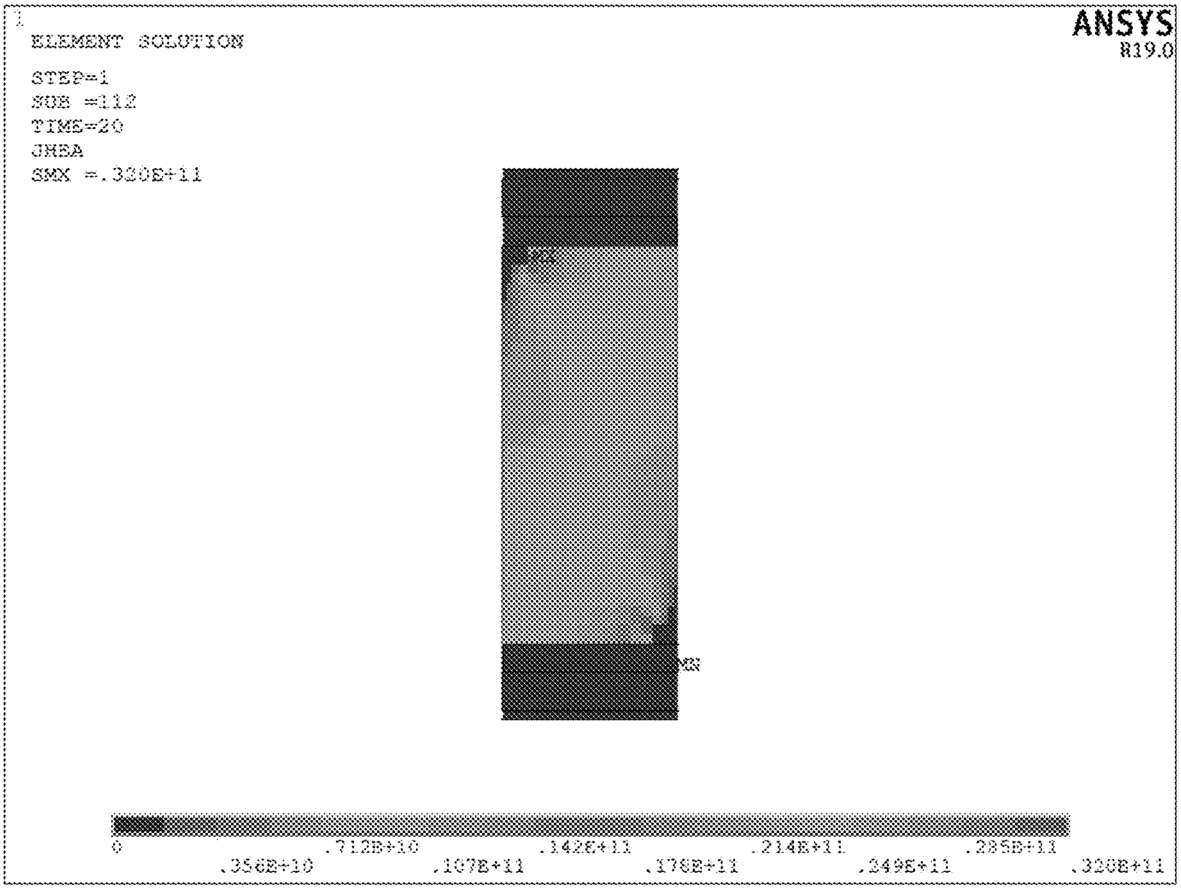
FIG. 7 is a schematic diagram of Joule heat distribution of the heater according to Embodiment 1 of this application.

FIG. 6 is a schematic diagram of a temperature field of the heater 10. It can be seen from the figure that, compared with FIG. 2, an area of a high-temperature region of the base body 11 is larger, and the uniformity of the temperature field of the base body 11 is improved significantly. FIG. 7 is a schematic diagram of Joule heat distribution of the heater 10. It can be seen from the figure that, the first end A and the second end B of the infrared electrothermal coating 12 have higher Joule heat density, which can effectively compensate a temperature loss at the two ends of the base body 11.

It should be noted that, arrangements of the first arc electrode 132 and the second arc electrode 142 are not limited to the situations shown in FIG. 3 and FIG. 4. A plurality of first arc electrodes 132 and second arc electrodes 142 may be provided, positions of the first arc electrode 132 and the second arc electrode 142 may be at the same end, and the first arc electrode 132 and the second arc electrode 142 may also be formed by extending along only one circumferential direction of the base body 11.

It should be further noted that, only an equivalent resistance of a part of the infrared electrothermal coating 12 at one end may be set to be less than the equivalent resistance of the middle part of the infrared electrothermal coating 12 as required (in this case, the middle part of the infrared electrothermal coating 12 includes a part of the infrared electrothermal coating 12 at an other end). For example, to shorten a waiting time of smoke emission, the equivalent resistance of the part of the infrared electrothermal coating 12 adjacent to the first end A can be less than the equivalent resistance of the middle part of the infrared electrothermal coating 12 (in this case, the middle part of the infrared electrothermal coating 12 includes the part of the infrared electrothermal coating 12 at the second end B) by arranging the first arc electrode 132.

EMBODIMENT 2

Figure 8:
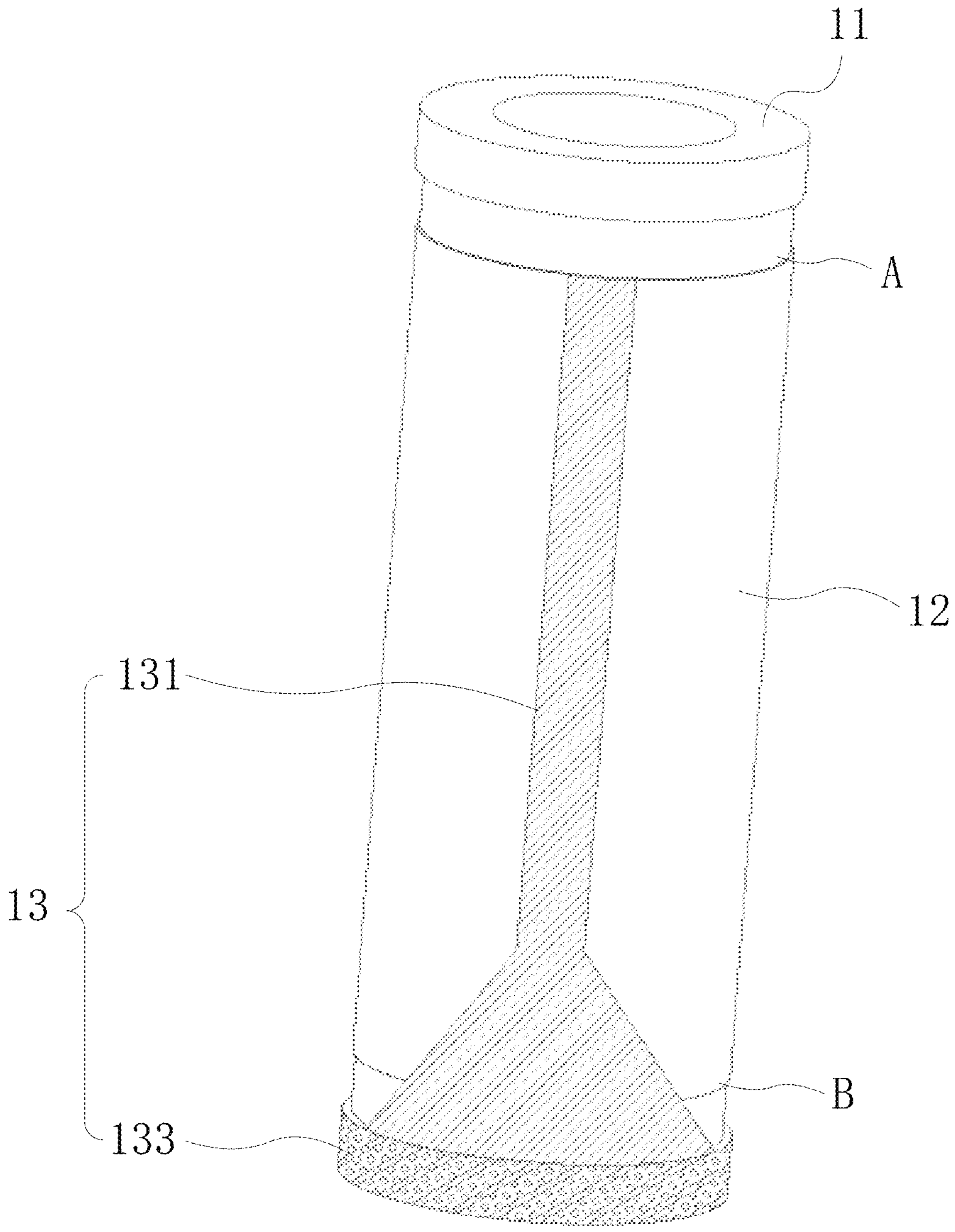
FIG. 8 is a schematic diagram of a heater according to Embodiment 2 of this application.
Figure 9:
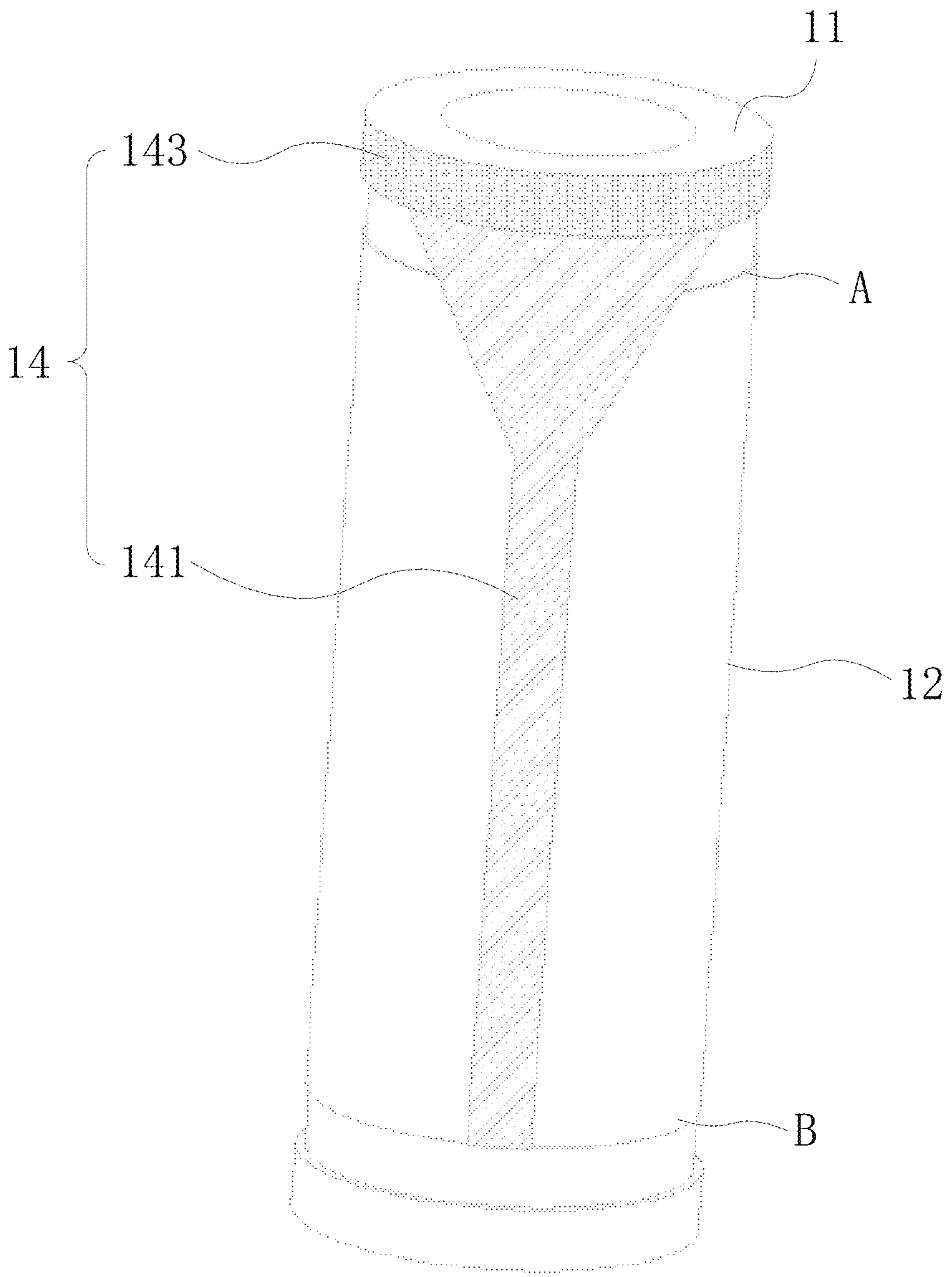
FIG. 9 is a schematic diagram of the heater from another angle of view according to Embodiment 2 of this application.
Figure 10:
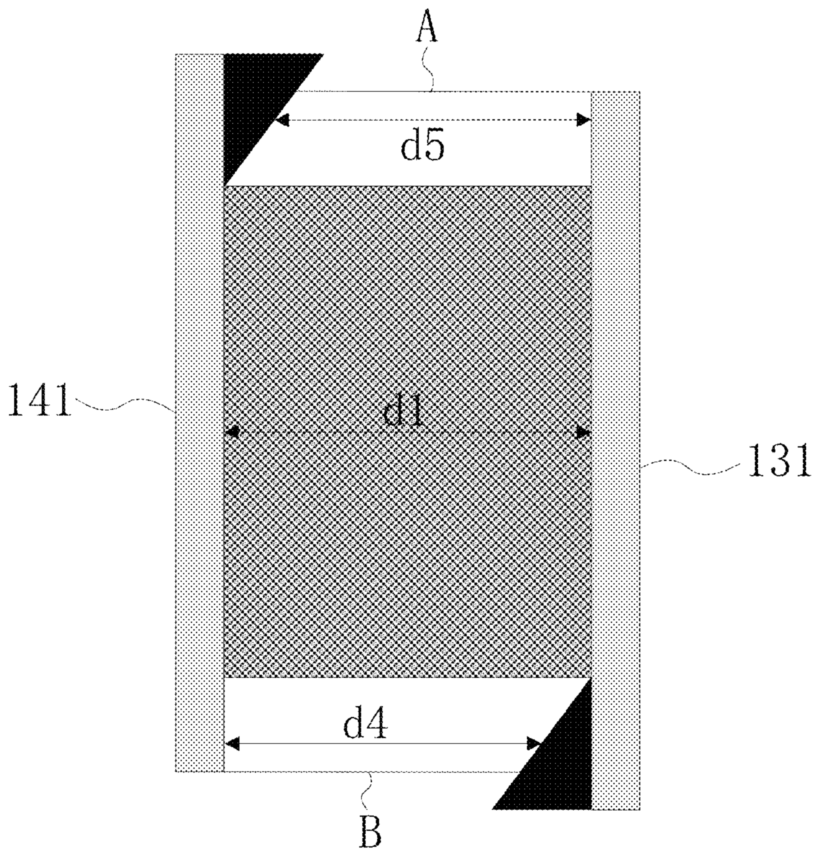
FIG. 10 is a schematic diagram of a part of an outer surface unfolded of the heater according to Embodiment 2 of this application.

FIG. 8 to FIG. 10 show a heater according to Embodiment 2 of this application. Different from Embodiment 1, a circumferential length of the second bar electrode 141 gradually decreases along a direction from the first end A to the middle part of the infrared electrothermal coating 12, so that a distance d5 between the second bar electrode 141 and the first bar electrode 131 gradually increases, and the equivalent resistance of the part of the infrared electrothermal coating 12 also gradually increases but is less than the equivalent resistance of the middle part of the infrared electrothermal coating 12 (a mesh part in the figure); and a circumferential length of the first bar electrode 131 gradually decreases along a direction from the second end B to the middle part of the infrared electrothermal coating 12, so that a distance d4 between the first bar electrode 131 and the second bar electrode 141 gradually increases, and the equivalent resistance of the part of the infrared electrothermal coating 12 also gradually increases but is less than the equivalent resistance of the middle part of the infrared electrothermal coating 12.

After conducting electricity, larger current density and more heat are generated at the part of the infrared electrothermal coating 12 adjacent to the first end A and the part of the infrared electrothermal coating 12 adjacent to the second end B, to implement temperature compensation at the two ends of the base body 11, thereby improving uniformity of a temperature field of the base body 11. Because the equivalent resistance of the part of the infrared electrothermal coating 12 gradually increases along the direction from the first end A to the middle part of the infrared electrothermal coating 12 (or the direction from the second end B to the middle part of the infrared electrothermal coating 12), Joule heat density of the part of the infrared electrothermal coating 12 is also gradually distributed. Compared with Embodiment 1, the uniformity of the temperature field of the base body 11 is improved more significantly.

Figure 11:
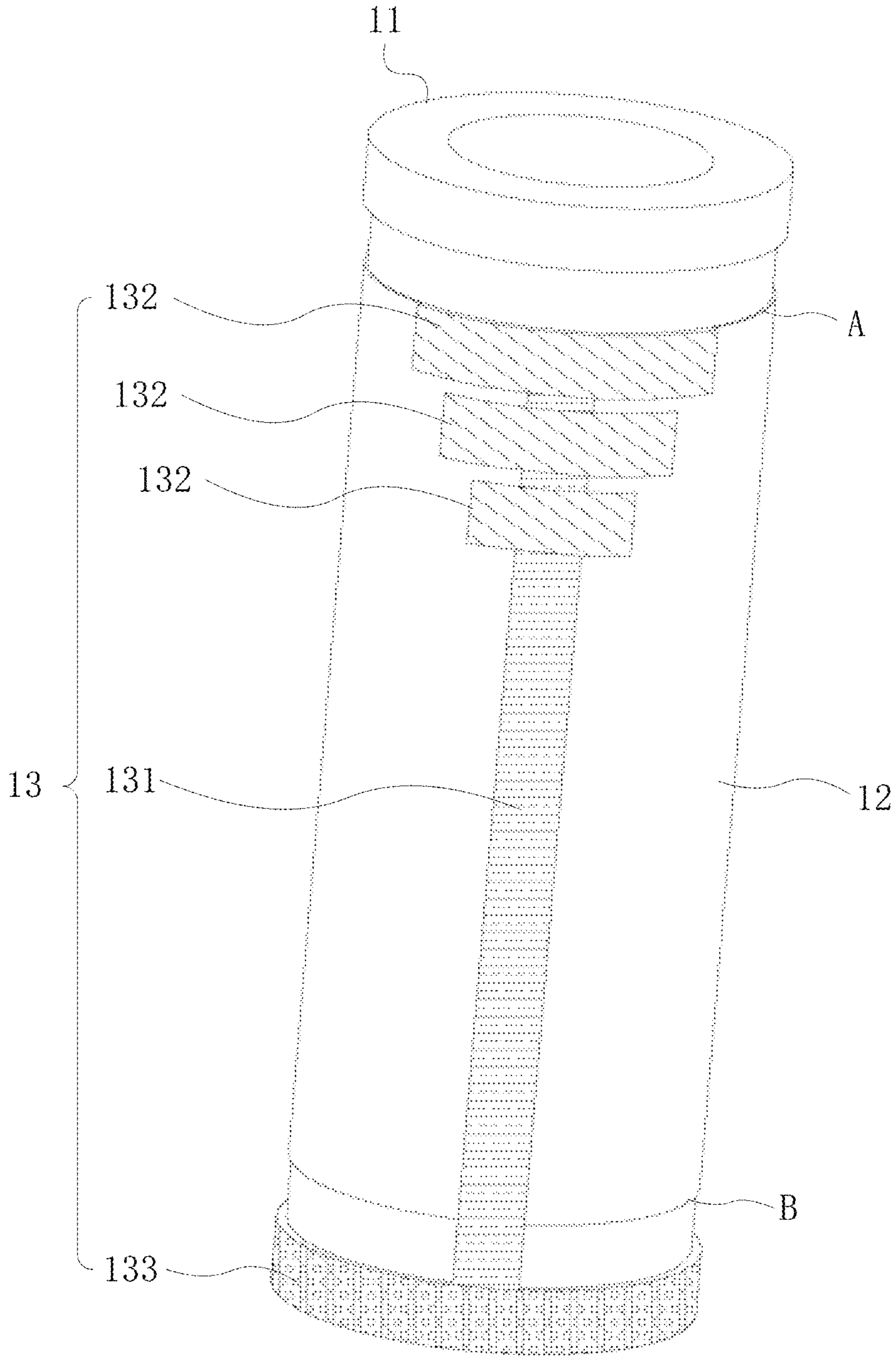
FIG. 11 is a schematic diagram of another heater according to Embodiment 2 of this application.
Figure 12:
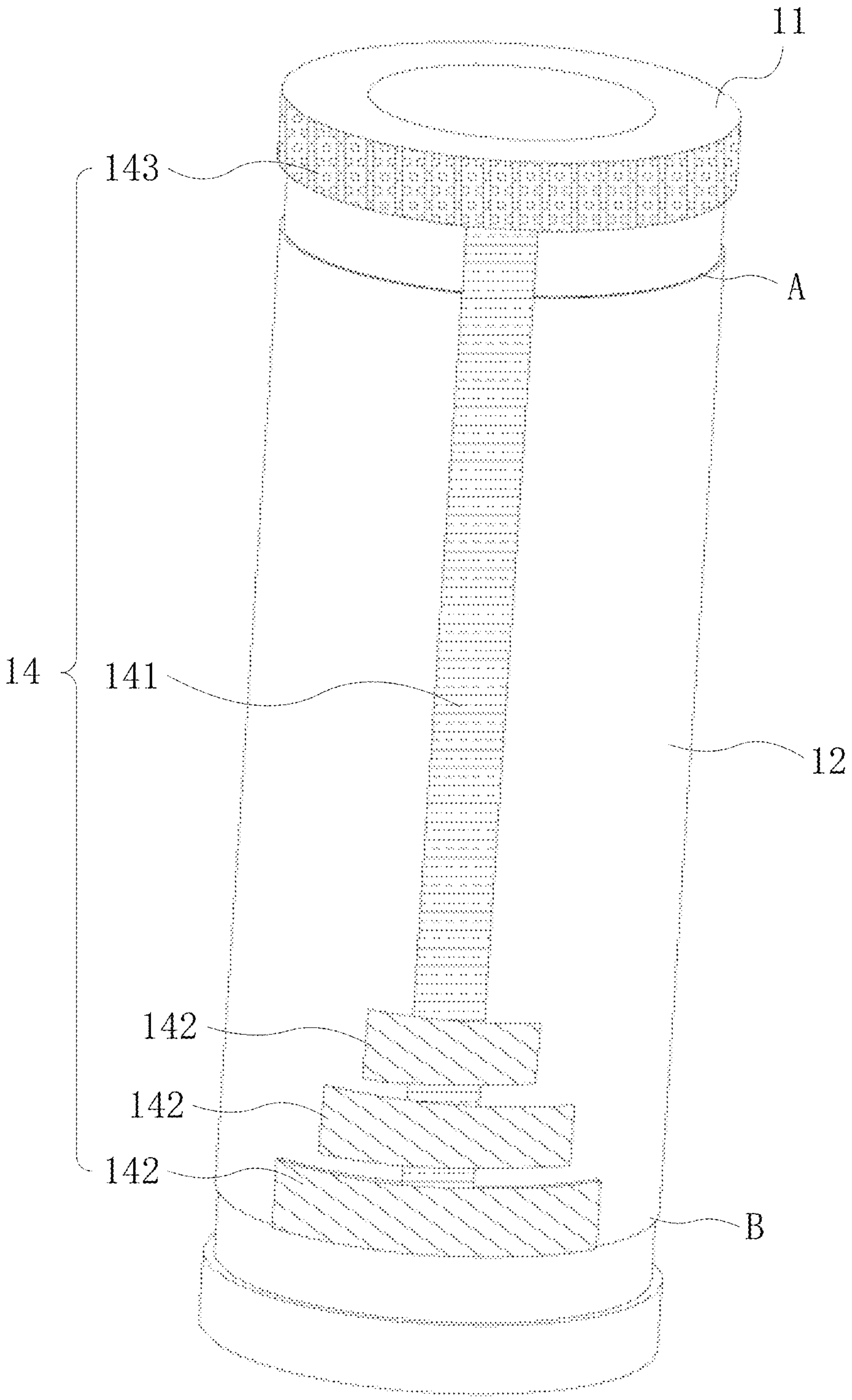
FIG. 12 is a schematic diagram of another heater from another angle of view according to Embodiment 2 of this application.

It should be noted that, Embodiment 2 is not limited to the situations shown in FIG. 8 to FIG. 10. As shown in FIG. 11 to FIG. 12, the first electrode 13 may include a plurality of first arc electrodes 132, and each first arc electrode 132 equidistantly extends from the first bar electrode 131 along the two opposite circumferential directions (clockwise and counterclockwise) of the base body 11. Circumferential lengths of the plurality of first arc electrodes 132 gradually decrease along the direction from the first end A to the middle part of the infrared electrothermal coating 12, so that the distance between the first bar electrode 131 and the second bar electrode 141 gradually increases, and the equivalent resistance of the part of the infrared electrothermal coating 12 also gradually increases but is less than the equivalent resistance of the middle part of the infrared electrothermal coating 12. Similarly, the second electrode 14 may also include a plurality of second arc electrodes 142.

EMBODIMENT 3

Figure 13:
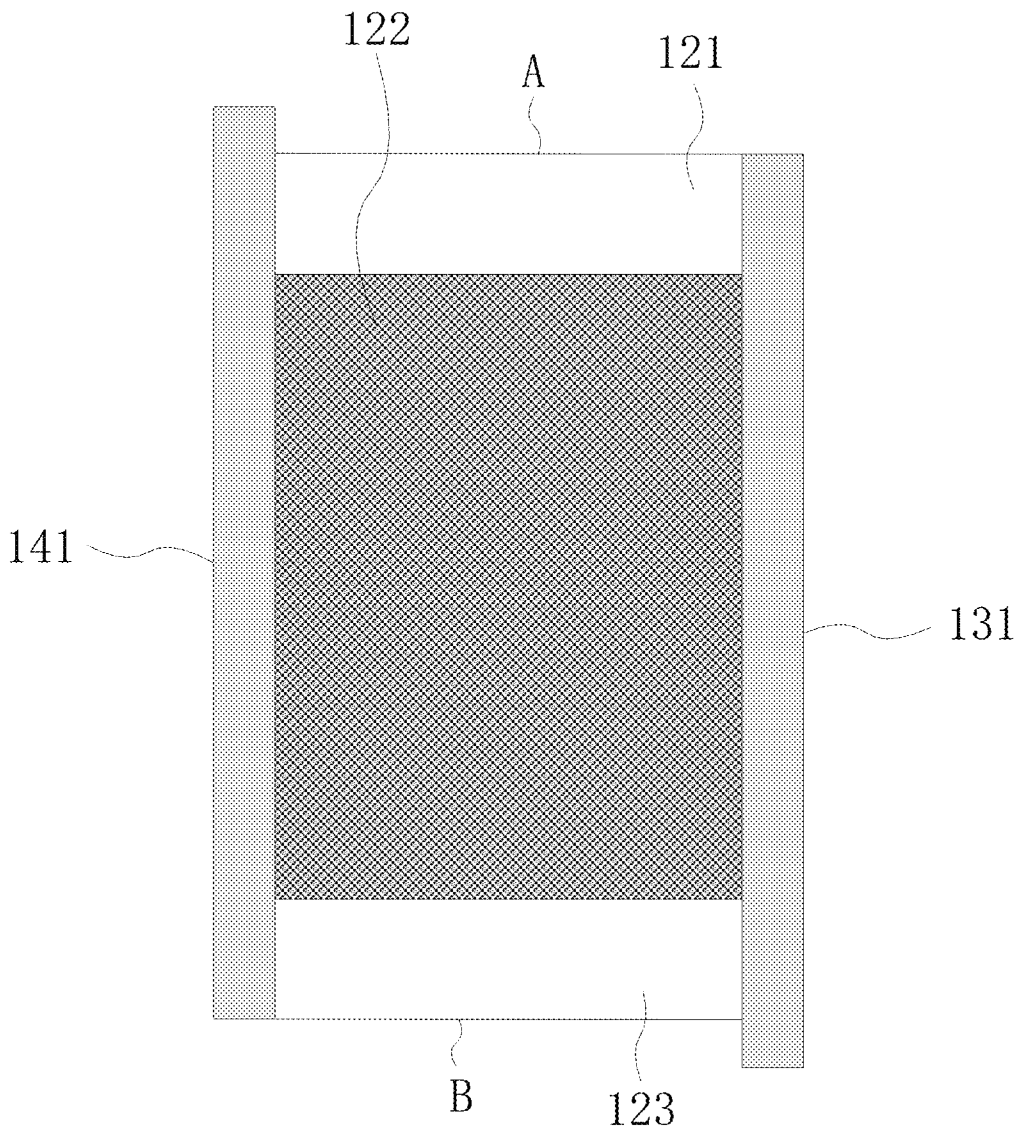
FIG. 13 is a schematic diagram of a part of an outer surface unfolded of a heater according to Embodiment 3 of this application.

FIG. 13 is a schematic diagram of a part of an outer surface unfolded of a heater according to Embodiment 3 of this application. Different from Embodiment 1, the first electrode 13 does not include the first arc electrode 132, and the second electrode 14 does not include the second arc electrode 142; and the infrared electrothermal coating 12 may be divided into a first infrared electrothermal coating 121, a second infrared electrothermal coating 122, and a third infrared electrothermal coating 123 along an axial direction of the base body 11.

Resistivities of the first infrared electrothermal coating 121 and the third infrared electrothermal coating 123 are both less than a resistivity of the second infrared electrothermal coating 122, so that equivalent resistances of the first infrared electrothermal coating 121 and the third infrared electrothermal coating 123 are both less than an equivalent resistance of the second infrared electrothermal coating 122, and after conducting electricity, the first infrared electrothermal coating 121 adjacent to the first end A and the third infrared electrothermal coating 123 adjacent to the second end B generate larger current density and more heat to implement the temperature compensation at the two ends of the base body 11, thereby improving the uniformity of the temperature field of the base body 11.

Alternatively, film thicknesses of the first infrared electrothermal coating 121 and the third infrared electrothermal coating 123 are both greater than a film thickness of the second infrared electrothermal coating 122, so that equivalent resistances of the first infrared electrothermal coating 121 and the third infrared electrothermal coating 123 are both less than an equivalent resistance of the second infrared electrothermal coating 122, and after conducting electricity, the first infrared electrothermal coating 121 adjacent to the first end A and the third infrared electrothermal coating 123 adjacent to the second end B generate larger current density and more heat to implement the temperature compensation at the two ends of the base body 11, thereby improving the uniformity of the temperature field of the base body 11.

EMBODIMENT 4

Figure 14:
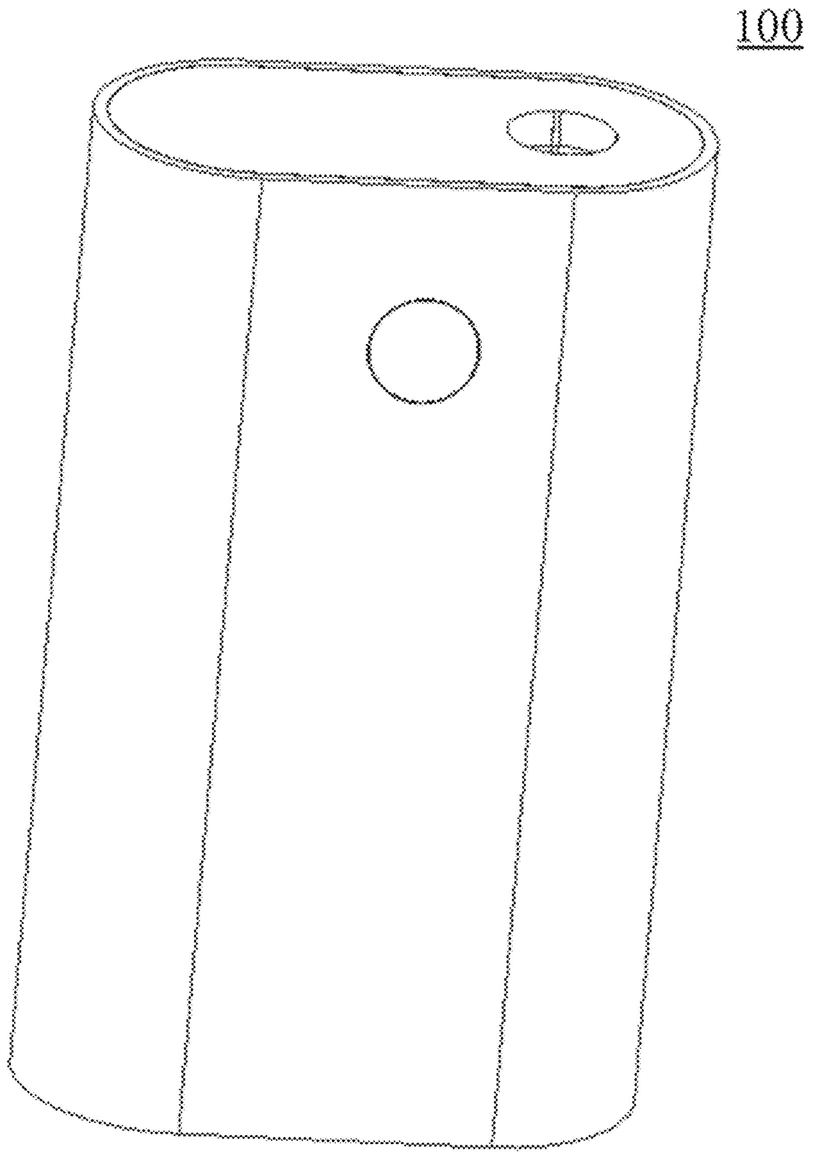
FIG. 14 is a schematic diagram of a cigarette device according to Embodiment 4 of this application.
Figure 15:
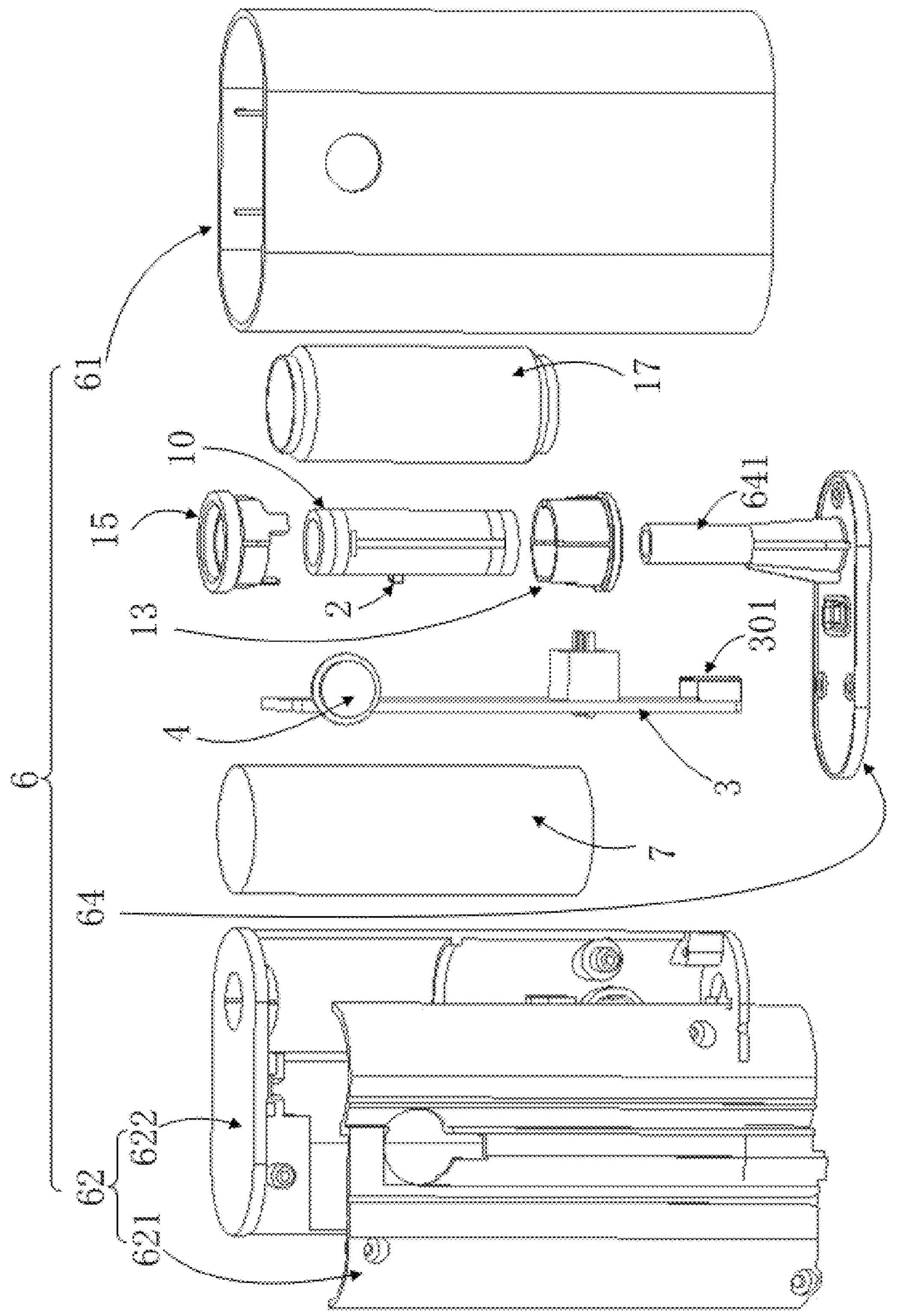
FIG. 15 is a schematic exploded view of the cigarette device according to Embodiment 4 of this application.

FIG. 14 to FIG. 15 show a cigarette device 100 according to Embodiment 4 of this application. The cigarette device 100 includes a housing assembly 6 and the above heater 10, and the heater 10 is arranged in the housing assembly 6. In the cigarette device 100 in this embodiment, an infrared electrothermal coating 12 and a first electrode 13 and a second electrode 14 electrically connected to the infrared electrothermal coating 12 are arranged on an outer surface of a base body 11. The infrared electrothermal coating 12 can emit infrared rays to heat an aerosol-forming substrate in a cavity of the base body 11 by radiation.

The housing assembly 6 includes a shell 61, a fixing shell 62, a base, and a bottom cap 64. The fixing shell 62 and the base are both fixed in the shell 61, where the base is used to fix the base body 11, the base is arranged in the fixing shell 62, and the bottom cap 64 is arranged at an end of the shell 61 and covers the shell 61. Specifically, the base includes a base 15 sleeved on a lower end portion of the base body 11 and a base 13 sleeved on an upper end portion of the base body 11, and the base 15 and the base 13 are arranged in the fixing shell 62. An air inlet tube 641 is protruded on the bottom cap 64, and an end of the base 13 away from the base 15 is connected to the air inlet tube 641. The base 15, the base body 11, the base 13, and the air inlet tube 641 are coaxially arranged, the base body 11 may be sealed with the base 15 and the base 13 by a seal member, the base 13 and the air inlet tube 641 may also be sealed by a seal member, and the air inlet tube 641 is in communication with external air for smooth air intake when a user inhales.

The cigarette device 100 further includes a main control circuit board 3 and a battery 7. The fixing shell 62 includes a front shell 621 and a rear shell 622, and the front shell 621 is fixedly connected to the rear shell 622. The main control circuit board 3 and the battery 7 are both arranged in the fixing shell 62, and the battery 7 is electrically connected to the main control circuit board 3. A button 4 is protruded on the shell 61, and the infrared electrothermal coating 12 on a surface of the base body 11 can be powered on or powered off by pressing the button 4. The main control circuit board 3 is further connected to a charging interface 301, and the charging interface 301 is exposed on the bottom cap 64. The user can charge or upgrade the cigarette device 100 through the charging interface 301 to ensure continuous use of the cigarette device 100.

The cigarette device 100 further includes a heat insulation tube 17. The heat insulation tube 17 is arranged in the fixing shell 62. The heat insulation tube 17 is arranged at a periphery of the base body 11. The heat insulation tube 17 can prevent a large amount of heat from being transferred to the shell 61 to make the user feel hot. The heat insulation tube includes a heat insulation material, and the heat insulation material may be heat insulation adhesive, aerogel, aerogel felt, asbestos, aluminum silicate, calcium silicate, diatomite, zirconia, and the like. The heat insulation tube may also be a vacuum heat insulation tube. An infrared reflecting coating for reflecting the infrared rays emitted from the infrared electrothermal coating 12 on the base body 11 back to the infrared electrothermal coating 12 may be formed in the heat insulation tube 17 to improve heating efficiency.

The cigarette device 100 further includes a temperature sensor 2, such as an NTC temperature sensor, configured to detect a real-time temperature of the base body 11 and transmit the detected real-time temperature to the main control circuit board 3, and the main control circuit board 3 adjusts a magnitude of a current flowing through the infrared electrothermal coating 12 according to the real-time temperature. Specifically, when the NTC temperature sensor detects a low real-time temperature in the base body 11, for example, detects that a temperature at an inner side of the base body 11 is less than 150° C., the main control circuit board 3 controls the battery 7 to output a high voltage to an electrode, thereby increasing a current fed into the infrared electrothermal coating 12, improving heating power of the aerosol-forming substrate, and reducing a waiting time before the first inhalation of the user. When the NTC temperature sensor detects that the temperature of the base body 11 ranges from 150° C. to 200° C., the main control circuit board 3 controls the battery 7 to output a normal voltage to the electrode. When the NTC temperature sensor detects that the temperature of the base body 11 ranges from 200° C. to 250° C., the main control circuit board 3 controls the battery 7 to output a low voltage to the electrode. When the NTC temperature sensor detects that the temperature of the base body 11 is or above 250° C., the main control circuit board 3 controls the battery 7 to stop outputting the voltage to the electrode.

It should be noted that, the specification of this application and the accompanying drawings thereof illustrate preferred embodiments of this application. However, this application can be implemented in various different forms, and is not limited to the embodiments described in this specification. These embodiments are not intended to be an additional limitation on the content of this application, and are described for the purpose of providing a more thorough and comprehensive understanding of the content disclosed in this application. Moreover, the above technical features can further be combined to form various embodiments not listed above, and all such embodiments shall be construed as falling within the scope of the specification of this application. Further, a person of ordinary skill in the art can make improvements and variations according to the above descriptions, and such improvements and variations shall all fall within the protection scope of the appended claims of this application.

What is claimed is:

1. A heater, comprising:

a base body, having a surface;

an infrared electrothermal coating, having a first end and a second end opposite to each other, wherein the infrared electrothermal coating is formed on the surface of the base body and axially extends from the first end to the second end; and a conductive module, including a first electrode and a second electrode spaced on the base body, wherein the first electrode includes a first bar electrode extending from the first end to the second end, the second electrode includes a second bar electrode extending from the first end to the second end, and at least a part of the infrared electrothermal coating is located between the first bar electrode and the second bar electrode; wherein an equivalent resistance of a part of the infrared electrothermal coating adjacent to the first end is less than an equivalent resistance of a middle part of the infrared electrothermal coating; and/or an equivalent resistance of a part of the infrared electrothermal coating adjacent to the second end is less than an equivalent resistance of the middle part of the infrared electrothermal coating.

2. The heater according to claim 1, wherein a circumferential distance between a part of the first bar electrode adjacent to the first end and the second bar electrode is less than a circumferential distance between a middle part of the first bar electrode and the second bar electrode; and a circumferential distance between a part of the first bar electrode adjacent to the second end and the second bar electrode is less than a circumferential distance between a middle part of the first bar electrode and the second bar electrode.

3. The heater according to claim 2, wherein the first electrode further includes at least one first arc electrode extending from the first bar electrode along a circumferential direction of the base body;

the second electrode further includes at least one second arc electrode extending from the second bar electrode along the circumferential direction of the base body; and the first arc electrode and the second arc electrode are both adjacent to the first end or the second end.

4. The heater according to claim 3, wherein the first arc electrode is adjacent to the first end, and the second arc electrode is adjacent to the second end.

5. The heater according to claim 4, wherein the first arc electrode extends equidistantly from the first bar electrode along two opposite circumferential directions of the base body, and the second arc electrode extends equidistantly from the second bar electrode along two opposite circumferential directions of the base body.

6. The heater according to claim 5, wherein a circumferential length of the first arc electrode and a circumferential length of the second arc electrode both range from 20% to 30%, preferably 25%, of a circumferential length of the base body.

7. The heater according to claim 2, wherein an equivalent resistance of the infrared electrothermal coating gradually increases along a direction from the first end to the middle part of the infrared electrothermal coating; and the equivalent resistance of the infrared electrothermal coating gradually increases along a direction from the second end to the middle part of the infrared electrothermal coating.

8. The heater according to claim 7, wherein a circumferential distance between the first bar electrode and the second bar electrode gradually increases along the direction from the first end to the middle part of the infrared electrothermal coating; and the circumferential distance between the first bar electrode and the second bar electrode gradually increases along the direction from the second end to the middle part of the infrared electrothermal coating.

9. The heater according to claim 8, wherein a circumferential length of the second bar electrode gradually decreases along the direction from the first end to the middle part of the infrared electrothermal coating; and a circumferential length of the first bar electrode gradually decreases along the direction from the second end to the middle part of the infrared electrothermal coating.

10. The heater according to claim 1, wherein the first electrode further includes a first annular electrode electrically connected to the first bar electrode, and the first annular electrode is arranged between the second end and an end portion of the base body; and the second electrode further includes a second annular electrode electrically connected to the second bar electrode, and the second annular electrode is arranged between the first end and an other end portion of the base body.

11. The heater according to claim 10, wherein none of the first annular electrode and the second annular electrode is in contact with the infrared electrothermal coating.

12. The heater according to claim 1, wherein resistivities of the part of the infrared electrothermal coating adjacent to the first end and the part of the infrared electrothermal coating adjacent to the second end are both less than a resistivity of the middle part of the infrared electrothermal coating; or, film thicknesses of the part of infrared electrothermal coating adjacent to the first end and the part of infrared electrothermal coating adjacent to the second end are both greater than a film thickness of the middle part of the infrared electrothermal coating.

13. A cigarette device, including a housing assembly and the heater according to claim 1, wherein the heater is arranged in the housing assembly.

* * * * *